United States Patent

Akom

Patent Number: 4,567,686
Date of Patent: Feb. 4, 1986

[54] FISHING TIP-UP

[76] Inventor: Michael M. Akom, P.O. Box 571, Leslie, Mich. 49251

[21] Appl. No.: 682,097

[22] Filed: Dec. 17, 1984

[51] Int. Cl.$^4$ ............................................. A01K 97/12
[52] U.S. Cl. ........................................ 43/17; 43/19.2
[58] Field of Search .................. 43/17, 15, 16, 19.2; 248/188.6, 188.7, 167

[56] References Cited

U.S. PATENT DOCUMENTS

| | | | |
|---|---|---|---|
| 2,030,775 | 2/1936 | Twiss | 248/167 |
| 2,834,140 | 5/1958 | Knier | 43/17 |
| 2,976,640 | 3/1961 | Sensenbrenner | 43/19.2 |
| 3,078,610 | 2/1963 | Howell | 43/17 |
| 4,033,062 | 7/1977 | Denecky | 43/19.2 |
| 4,373,287 | 2/1983 | Grahl | 43/17 |

Primary Examiner—Gene P. Crosby
Attorney, Agent, or Firm—Miller, Morriss & Pappas

[57] ABSTRACT

A plastic collapsible and nesting tip-up unit has a poised tilt arm and flared windscoop to move the bait in a rhythmic motion. A plastic and adjustable drag type reel is provided with a with simplified signal trip arrangement.

5 Claims, 7 Drawing Figures

U.S. Patent Feb. 4, 1986 Sheet 3 of 3 4,567,686
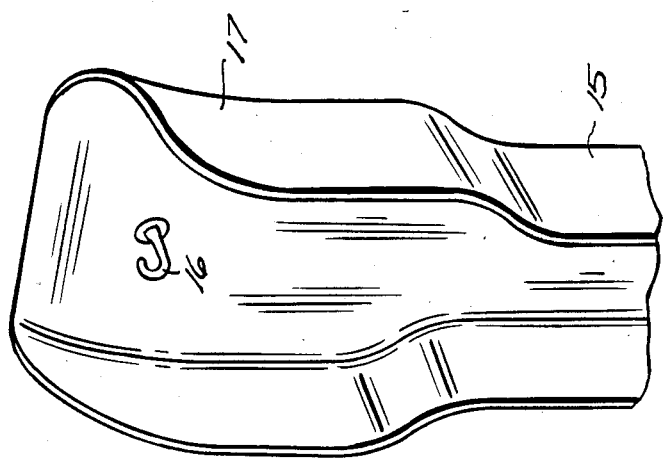
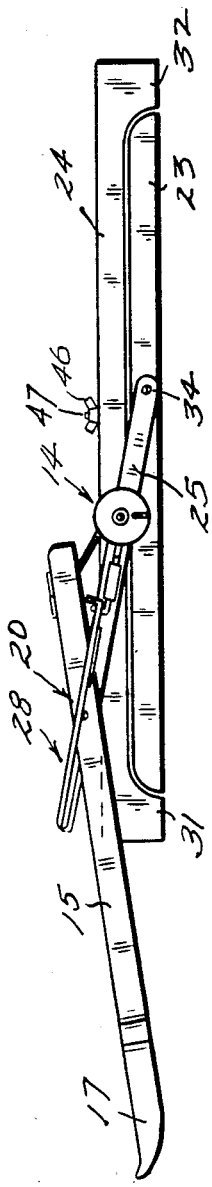
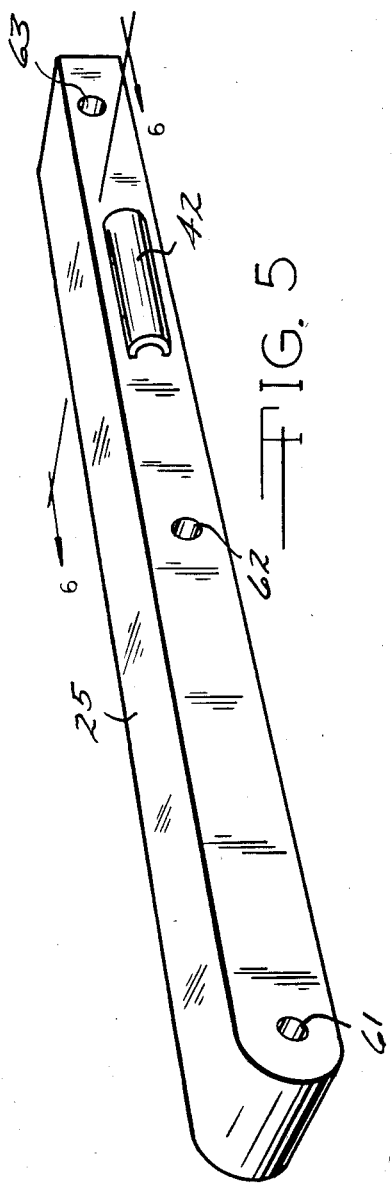
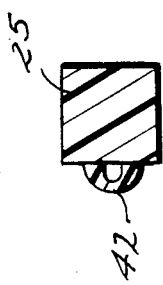

FISHING TIP-UP

The present invention relates to a new and improved tip-up unit for ice fishing. These tip-ups are positioned over fishing holes cut in the ice and they signal when a fish strikes a lure depending from them and extending into the water through the hole. More particularly, the present invention is directed to a three-piece plastic collapsing and nesting frame with two legs and mast, a portion of which is pivotally embraced by a tilting arm. The frame supports a reel which is drag adjustable and the reel is provided with a trip lever extension that moves with the reel movement to operably contact and release a signal trigger. The trigger releases the signal flag spring so that the flag alerts the fisherman to a strike at the tip-up fishing station served by the particular tip-up unit. The tilt arm extends outwardly over an opening in the ice through which fishing proceeds. The forward-most end of the tilt arm which extends over the opening in the ice includes an integral windscoop. On the underside of the windscoop a line guide or hook is located which depends therefrom. The fishing line from the reel is trained over the line guide and the line extends from the line guide or hook into the hole in the ice and into the water.

A spring counterpoises the tilting arm against the weight of the lure and then reacts against the wind as it impacts against the scoop or scoop flare at the forward end of the tilt arm. This provides a gentle and irregular jigging action which automatically raises and lowers the lure and line rigging in the water. The frame is made from a high strength dimensionally stable plastic and the tilt arm is drape-formed from plastic sheet. The reel or spool is of plastic material and the metal fasteners, springs and wireforms are preferred in stainless steel to provide a fishing tip-up possessing a complete durability exceeding that of wood and so that the use of the plastic in the ice-cold weather eliminates seizing at the pivots and freezing into the ice with attendant damage to the tip-up. Low friction pivot points assure smooth and sensitive jigging performance in the tilt arm and minimizes icing at the functioning joints. The metal fasteners are preferred in stainless steel.

Prior art devices are primarily structures in wood and are well-known in many forms to ice fishermen. None of the earlier tip-ups, to the knowledge of the present inventor, provide a substantially complete nesting plastic structure which is simple and inexpensive while providing wind induced jigging and sensitive triggering.

Accordingly, the principal object of the present invention is to provide a new, improved and collapsible nestable structure that is easy to use and durable beyond a single season of use.

Another object is to combine in the structure a wind assist jigging action having trunnion bearings at the pivot joint which resists icing.

Other objects, including simplicity and economy with inclusion of all desirable features in the tip-up, will be more appreciated as the description proceeds.

GENERAL DESCRIPTION

In general, the tip-up unit of the present invention is made using a plastic frame which is in three parts. There are a pair of leg elements, one smaller or shorter leg than the other, and a mast. The legs are pivotally connected to each other substantially midway of their ends. The mast is pivotally secured to the smaller leg rearwardly adjacent the center point of the legs and transversely of the pivotal connection of the legs. These are adjustably oriented and may be collapsed as desired. They may also be disassembled at the pivots. A plastic tilt arm having a channel-like cross section straddles the upper end of the mast and is loosely and pivotally connected thereto so as to move in a plane parallel with one side of the smaller leg of the frame. A windscoop is on the forward end of the tilt arm and achieves its wind-engaging surface by an expansion of the channel shape outwardly beyond the smaller leg. The windscoop has a depending line guide. A balancing or counterpoising spring is connected to the mast and also to the rearmost end of the tilt arm. A plastic reel is journalled and supported by the mast and the reel includes an extension or projection which is offset from the turning axis of the reel and parallel thereto.

Opposite the reel mounting, a flag assembly is secured to the mast and this assembly includes a flat spring with a bent upper end to form a trip element. A flag is provided on the flat spring adjacent the bent upper end and the flag in the released position of the flag assembly is projected by the spring into the air vertically. A wireform trigger is operably connected to the mast and is bent to engage the bent end of the flat spring element when the flag assembly is looped over the mast and down toward the wireform trigger. The trigger also includes an offset trigger extension which, upon capture of the flag assembly, is in an interference path with the extension piece of the reel so that when the reel turns responsive to the runnning out of line, then the extension piece presses against the trigger extension, rotating the trigger, and releasing the flag assembly.

Thereupon, the flag on the flat spring pops into a substantially vertical position and the fisherman rushes to land the fish or reset the tip-up unit.

The reel includes a variably set drag and in operation the tilt arm gently raises and lowers the lure in accord with varying winds from front or back striking and moving the scoop and tilt arm in an efficient and provocative (to fish) action.

IN THE DRAWINGS

FIG. 4 is a side elevation view of the tip-up of the present invention in collapsed nesting condition.

FIG. 5 is a perspective view of the mast element of the frame of the tip-up of the present invention.

FIG. 6 is a full section elevation through the mast element of FIG. 5 taken on the line 6—6 thereof.

FIG. 7 is a partial perspective view indicating the underside of the scoop portion of the tilt arm and shows the line guide or hook over which fishing line is trained when the unit is in use.

SPECIFIC DESCRIPTION

Figure 1:
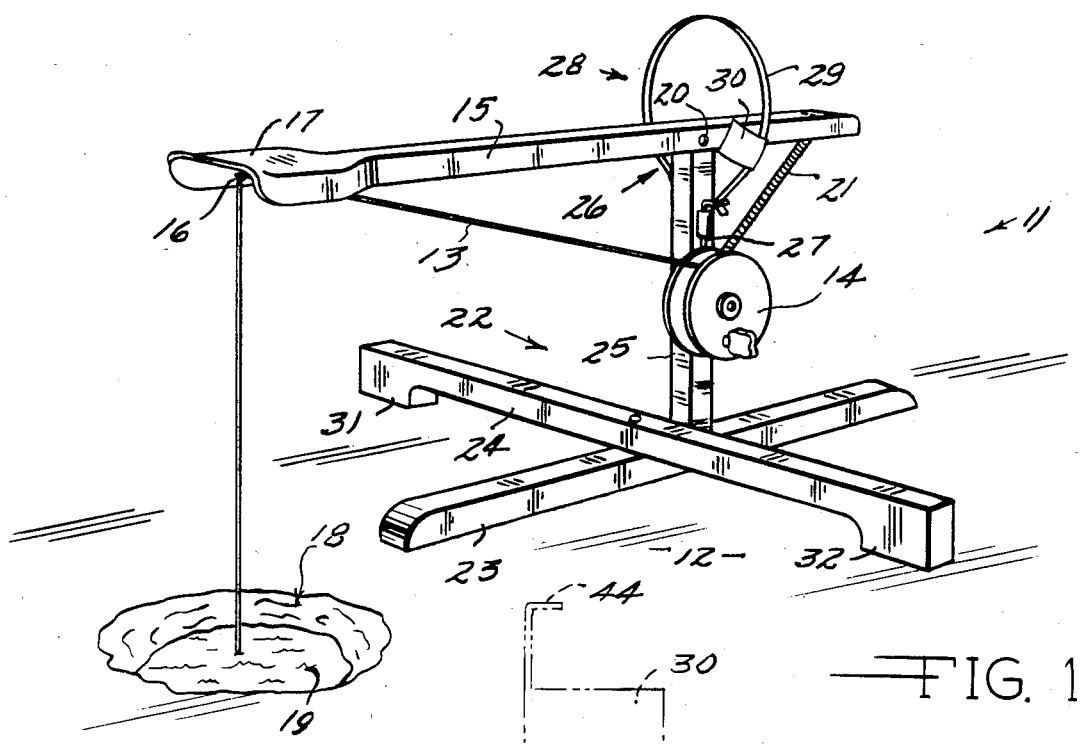
FIG. 1 is a perspective view of a tip-up in accord with the present invention erected on an ice surface and conventionally rigged to operate in an opening through the ice.

Referring to the drawings and with first specificity to the FIG. 1, the tip-up unit 11 is shown fully rigged and resting on ice 12. The ice fishing line 13, usually monofilament, is shown coiled on the reel 14 to running connection with the tilt arm 15 through the line guide 16 at the front or foremost end of the tilt arm 15 and depending from the windscoop 17. The rigging positions the line 13 over the opening 18 cut through the ice 12 to the water 19. As will be appreciated, the line 13 extends beneath the surface of the water 19 and is connected to bait, hooks, lures and weights where, hopefully, fish are attracted and strike or seize the bait or lure, impale themselves on the hook of the bait or lure and can then be retrieved by the ice fisherman through the opening 18 in the ice 12.

The tip-up unit 11 is intended to assist the fisherman, not by the mere poising of the line 13 above the opening of hole 18, but to animate and move the bait or lure in a rhythmic jigging or jiggling movement achieved by the combination of tilt arm 15 rocking on the pivot 20 as the force of wind acting on the scoop 17 from front, rear or sides overbalances the poising by the light counterweight or counterpoising spring 21 attached to the rearmost end 22 of the tilt arm 15. The pivot 20 is located about two-thirds of the way back from the windscoop 17 and the connection of the spring 21 to the tilt arm 15 is about one-third of the total length of the tilt arm 15. This, as can be seen, projects the tilt arm 15 forwardly and above the elements of the frame 22 built up of the articulated legs 23 and 24 and the mast 25. The leg 23 is shorter than the leg 24 and the legs 23 and 24 are pivotally connected at the vertical pivot 26. As will be appreciated, this pivot is preferably provided by a bolt and wing nut so that compression-locking of the legs 23 and 24 in a selected attitude can be easily achieved without the necessity for tools and the assembly may be as easily collapsed or disassembled. The mast 25 is pivotally connected at its lower end to the smaller leg 23 adjacent and rearwardly (as shown) of the crossing point of the legs 23 and 24. As will be appreciated, a bolt and wing nut are preferred for this connection to select the degree of erection or collapse of the mast 25 or to disassemble the unit 11. The upper end 26 of the mast 25 is pivotally connected in an easy running fit at the pivot 20. The mast 25 supports a wireform trigger 27 on the side of the mast 25 operably supporting the reel 14 and also the flag support assembly 28 which is shown in the cocked condition in the FIG. 1. As will be seen, an extension from the reel 14 is in interference relation with the trigger 25 when the flag support assembly 28 is "set" or cocked, as seen in the FIG. 1. The reel 14 includes a friction brake so that the reel 14 will turn when the force of a strike or fish is felt on the line 13. When the force is sufficient to turn the reel 14, then the reel 14 trips the trigger 27 freeing the flag assembly 28. At that point, the flat spring 29 springs upward and waving the attached flag 30 in warning as a signal to the fisherman to tend the line 13. Accordingly, the unit 11 provides control for line 13 and a signalling device that is as sensitive as the selected drag setting on the reel 14. The legs 23 and 24 collapse while on the pivot 26 to planar nesting registry. The smaller leg 23 nestles beneath the leg 24 and between the foot portions 31 and 32 at the ends thereof. This provides a secure straddling support for the unit 11. This design facilitates cutting the two legs 23 and 24 from a single piece of stock. The plastic from which the legs 23 and 24 and the mast 25 are made is a durable and rugged material having good dimensional stability at low temperatures. The preferred plastic or resin is a material such as polyethylene having a tactile pseudo-lubrication surface which makes the material easily freed from ice and snow build-up. ABS Plastic provides a very satisfactory material for the tilt arm 15 and provides good strength at low temperature levels. The material is very satisfactory for drape molding or injection molding, if desired. The surface treatment of the frame 22, reel 14 and tilt arm 15 is to provide a smooth surface free of sharp edges against mechanical retention of ice and snow accumulation. This provides a much superior performance than wood tip-ups in a wide variety of design.

Figure 3:
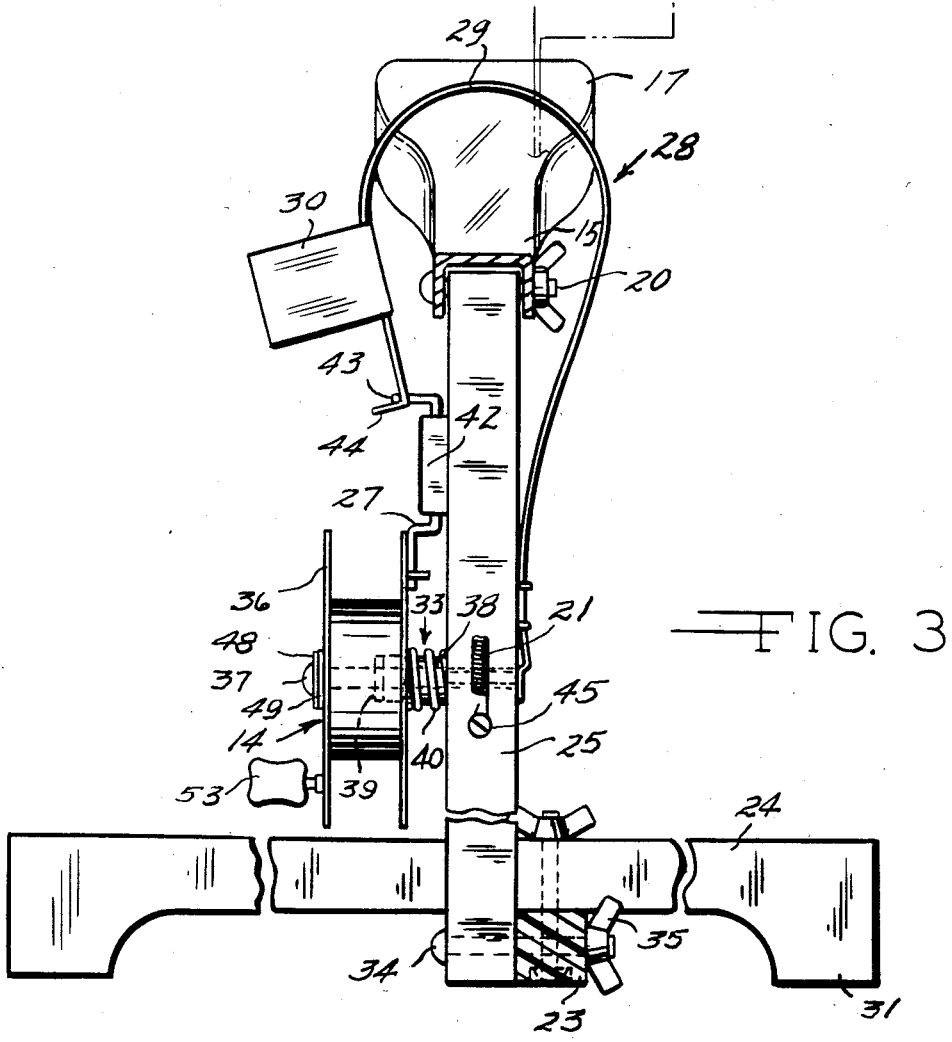
FIG. 3 is a rear elevation partly cutaway view of the tip-up of the present invention in its assembled relation and in cocked position.

In FIG. 3 the simplicity and construction of the reel 14 and brake or drag mechanism 33 can be better appreciated. Also, the support of the flag assembly 28 and the related wireform trigger 27 can be better understood, along with the pivot connection between mast 25 and smaller or shorter leg 23 by bolt 34 and wing nut 35.

The reel 14 is made up of an integrally formed or cast flange drummed spool 36 having an opening through its axis which receives a self-tapping screw 37. A plastic tubular bushing 38 separates the mast 25 from the reel 14 and rests in a counterbore 39 coaxially provided, as shown, in the reel 14. The tubular bushing 38 runs freely on the screw 37 and includes an outer helical compression spring 40 acting between the mast 25 and the spool 36. The screw 37 runs threadably into the mast 25 and by tightening or loosening the screw 37, the drag on the reel may be selectively varied and the bushing 38 running into the counterbore 39 provides good journal support from the mast 25. The bushing 38 also is seen to offset the reel 14 from the mast 25 providing operating clearance for the finger extension or projection from the reel 14 and the eccentric wireform trigger 27 rotationally secured in the sleeve 42. The sleeve is secured to the mast 25. The wireform includes, at its upper end, a bent portion 43 which hooks the bent end 44 of the flag assembly 28 on the uppermost end of the flat spring 29 when the unit 11 is rigged and cocked. The wireform trigger 27 is displaced by movement of the spool 36 when the extension 41 trips the trigger 27 and thus frees the flag assembly 29. Obedient to the spring 29, the flag 30 pops upward, as can be appreciated.

The lower terminal end of the spring 21 counterpoising the tilt arm 15 is seen secured to the mast 25 by a screw 45.

The tilt arm 15 is made of molded plastic material such as ABS with a channel shaped cross section providing excellent journalling for the pivot 20 and provides adequate strength to the unit 11 and arm 15. As also can be seen in the FIG. 3, the scoop portion 17 is an extension of the channel form flared to a scoop-like configuration responsive to winds which are fore, aft, and quartering in assurance of good jigging action.

Figure 2:
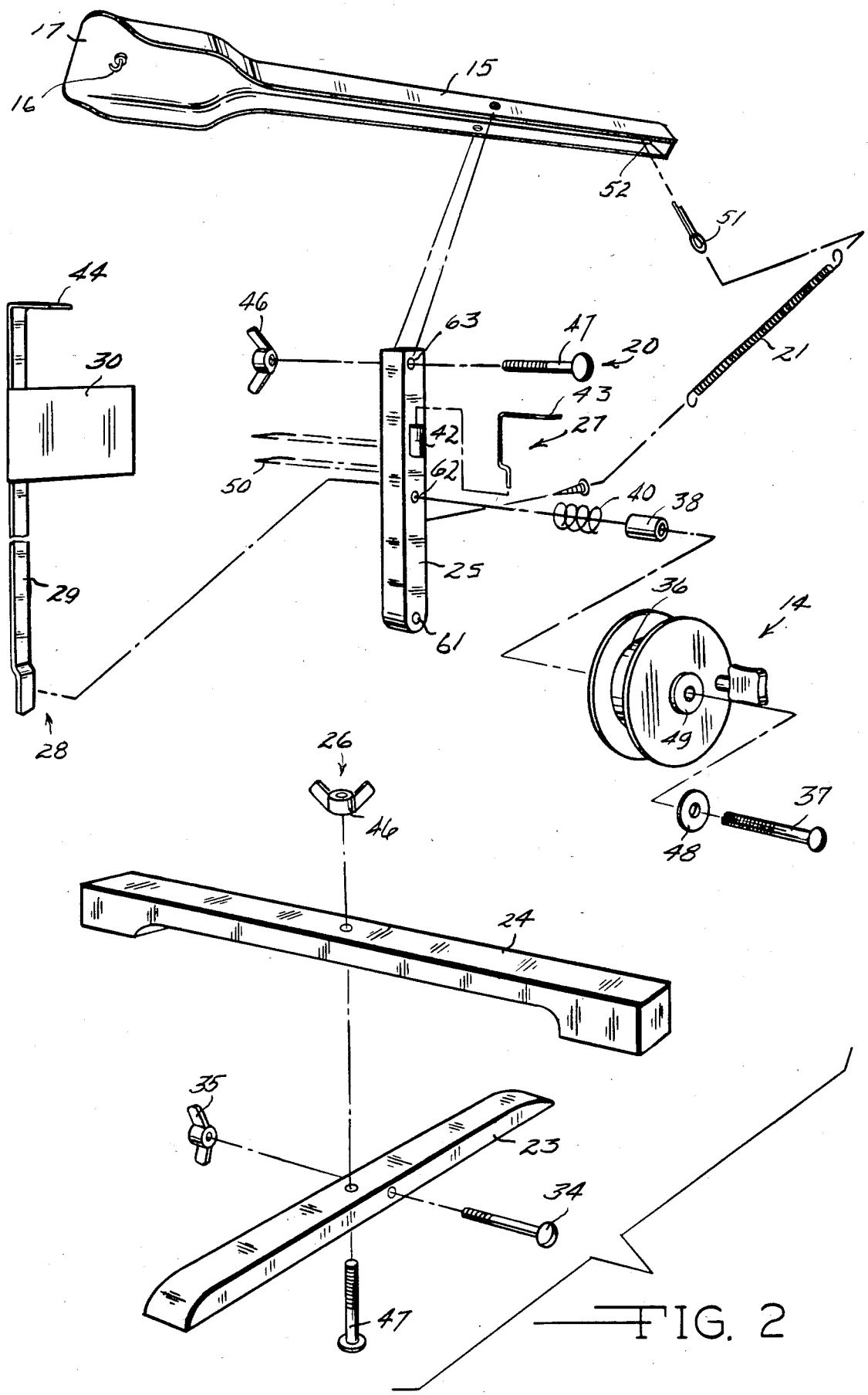
FIG. 2 is an exploded perspective view of the tip-up of the present invention and indicating the simplicity of construction and assembly.

In the FIG. 2, the simplicity of the unit 11 is best understood as the elements of the structure are seen in assembly and disassembly relationship. Wing nuts 46 on bolts 47 are seen as the pivots, as described, to achieve field control over assembly, disassembly and selected collapse of the structure for transport. The thrust washer 48 mating with the flange 49 of reel 14 assists in the frictional braking or drag feature. The lower end of the flat spring 29 is seen in respect to staples 50 which are driven into the mast 25 at assembly. The bend 44 in the upper end of the flat spring 29 is best appreciated in the FIG. 2. The cotter pin 51 is easily sprung through an opening 52 in the rear end of the tilt arm 15 and splayed at its bifurcated end to retain and support the counter poising by spring 21. At the reel 14, the trip extension 41 is easily seen and the crank handle 53 is understood.

FIG. 4 provides a visualization of the nesting of the frame 22 and the tilt arm 15 for assembled storage and transport. The leg 23 is seen beneath and nesting in the leg 24 and between the foot positions 31 and 32. It can also be seen in this Figure that the legs 23 and 24 can be cut from the same piece of plastic stock as by a band saw. The ease of assembly and disassembly is also apparent in the FIG. 4.

FIG. 5 best shows the mast 25 as an elongate piece of plastic having three openings 61, 62 and 63 therethrough and the split tubing piece forming the sleeve 42 provides journalling support for the wireform trigger 27. The opening 61 is for the pivot provided by bolt 34 in attachment to the leg 23. The opening 62 provides the guide hole for the self-tapping screw 37 in support of the reel 14 and the bushing 39 and brake spring 40. The opening 63 accommodates the pivot 20 operably connecting the channel shaped tilt arm 15 to the mast 25. The cross sections of FIG. 6 illustrate the attachment of the sleeve 42 to the mast 25.

FIG. 7 illustrates the windscoop 17 at the forward end of the tilt arm 15 and the extension and expansion of the molded plastic channel of arm 15 is best appreciated. In usage, scoop 17 and arm 15 catches wind from the front, rear or sides overcoming the poising by the spring 21 against the weight of lure and sinker (not shown) on the line 13 and assures pivotal movement on the pivot 20 to dump the wind and then repeat the very effective jiggling action. The depending line guide 16 is visible in the form of a hook over which line 13 is trained.

In use, the tip-up unit 11 represents a substantial advance over known structures in providing a plastic structure in the frame 22, reel 14 and tilt arm 15 to provide very good durability and attractiveness, along with flexible, easy assembly, disassembly and knock down. The plastic material adds the new dimension of selected durable color which cannot chip and peel. The flag signal works well and the structure is sensitive, simple and economical to produce, use and maintain. The metal portions are preferably prepared in stainless steel. Color can be molded into all of the plastic elements and the reel, the brake and wireform trigger are a substantial improvement over known tip-ups.

Other improvements, including resistance to weather and icing, will be readily appreciated by those who are users of tip-ups and ice fishermen generally.

Having thus described my new and improved tip-up unit, those skilled in the art will perceive improvements, changes and modifications and such improvements, changes and modifications are intended to be included in the spirit of the present invention, limited only by the scope of my hereinafter appended claims.

I claim:

1. A tip-up unit for ice fishing comprising:
   a three-piece articulated plastic frame including two leg elements, one smaller than the other, and in planar, nestable relation and pivotally connected together substantially at their mid points, and a mast element pivotally connected at the lower end thereof to the smaller of said leg elements, said frame collapsing into a group of substantially parallel elements;
   a plastic tilt arm generally channel shaped in cross section and pivotally journalled and poised on the upper end of said mast and in a substantially common plane with said smaller leg;
   a windscoop on the forward end of said tilt arm and extending in generally expanded channel shape beyond said smaller leg;
   a line guide depending from said windscoop;
   a balancing spring connected at one end to said mast and at the other end to the rearward end of said tilt arm;
   a reel journalled to and supported by said mast and said reel including an extension piece parallel and offset from the turning axis of said reel;
   a flag assembly secured at one end to said mast on the side of said mast opposite said reel and including a flat spring element bent at the upper end to provide a trip element and flag adjacent said bent end; and
   a wireform trigger is operably secured to the mast and bent to engage said bent end of said flat spring element when said flag assembly is looped over said mast and including an offset trigger extension portion in interference path with said extension piece of said reel when said flag assembly is retained in looped relation and freed by said extension piece of said reel upon selected rotation of said reel and thereupon releasing said bent end of said flag assembly.

2. In the structure of claim 1 wherein said reel includes a drag structure variably set between said mast and said reel.

3. In the structure of claim 2 in which said drag structure is a spring on a stub shaft, said spring acts between said reel and said mast and a threaded axial element through said reel and threadably into said mast to selectively compress said spring and brake said reel.

4. In the combination structure of claim 3 wherein frame, tilt arm and scoop, reel and extension therefrom, are of a durable, dimensionally stable plastic material.

5. A tip-up unit for ice fishing comprising:
   a pair of plastic leg elements, the smaller of said leg elements being cut from said larger leg element whereby said larger leg, when crossed over the center of said smaller of said leg element, is in a crossed relation and both of said legs thereupon are nestable, one upon the other, and are in a horizontal ice contacting relation with the lower contacting surfaces of the legs lying in a common plane;
   a bolt vertically oriented and passing through both of said leg elements at the center crossing;
   a wing nut threadably on said bolt and adjustably securing said legs in selected operating and collapsed nesting positions;
   a plastic mast pivotally attached to said smaller of said legs adjacent the center of said leg;
   a bolt horizontally through said smaller leg and said mast forming said pivotal connection of said mast to said smaller leg;
   a wing nut threadably on said bolt horizontally through said smaller leg and adjustably securing said mast to said smaller leg in selected operating and collapsed positions;
   a plastic tilt arm and integral windscoop in channel shaped cross section pivotally connected to the uppermost end of said mast and extending substantially in a tilting plane with said smaller leg;
   a bolt and wing nut forming said pivotal connection between said tilt arm and said mast substantially one-third of the distance from the rearmost end of said tilt arm and two-thirds of the way back from the foremost windscoop end of said tilt arm;
a line guide depending from the windscoop;
a drag reel operably secured with adjustable drag means to said mast and in approximate adjacent planar relationship beneath said line guide, said reel including a trip extension projecting from said reel and toward said mast;

a flag assembly including a flat spring secured on the side of said mast opposite said reel, a bent end on said spring, and a wireform trigger secured to said mast and trapping said bent portion of said flat spring upon a projecting portion of said trigger and in interference relation with said trip extension; and
a counterpoising spring connected between the rearmost end of said tilt arm and mast.

* * * * *